US012783257B2

(12) United States Patent
Furuyama et al.

(10) Patent No.: US 12,783,257 B2
(45) Date of Patent: Nov. 3, 2026

(54) MANAGEMENT DEVICE, MANAGEMENT METHOD, AND COMPUTER-READABLE STORAGE MEDIUM

(71) Applicant: NEC Corporation, Tokyo (JP)

(72) Inventors: Io Furuyama, Tokyo (JP); Kazuaki Nakajima, Tokyo (JP); Hirofumi Ueda, Tokyo (JP)

(73) Assignee: NEC CORPORATION, Tokyo (JP)

( * ) Notice: Subject to any disclaimer, the term of this patent is extended or adjusted under 35 U.S.C. 154(b) by 261 days.

(21) Appl. No.: 18/699,920

(22) PCT Filed: Nov. 11, 2021

(86) PCT No.: PCT/JP2021/041480
§ 371 (c)(1),
(2) Date: Apr. 10, 2024

(87) PCT Pub. No.: WO2023/084671
PCT Pub. Date: May 19, 2023

(65) Prior Publication Data
US 2024/0403070 A1 Dec. 5, 2024

(51) Int. Cl.
*G06F 9/445* (2018.01)

(52) U.S. Cl.
CPC ................................ *G06F 9/44505* (2013.01)

(58) Field of Classification Search
CPC .................................... G06F 1/32; G06F 9/44
See application file for complete search history.

(56) References Cited

U.S. PATENT DOCUMENTS

2021/0311461 A1* 10/2021 Verma ................. H04L 41/0803
2022/0374324 A1* 11/2022 Vittal .................. G06F 11/3409

FOREIGN PATENT DOCUMENTS

JP 2016-051399 A 4/2016
JP 2020-119236 A 8/2020

OTHER PUBLICATIONS

International Search Report for PCT Application No. PCT/JP2021/041480, mailed on Jan. 25, 2022.
English translation of Written opinion for PCT Application No. PCT/JP2021/041480, mailed on Jan. 25, 2022.

* cited by examiner

*Primary Examiner* — Keshab R Pandey
(74) *Attorney, Agent, or Firm* — Sughrue Mion, PLLC

(57) ABSTRACT

One purpose of the present disclosure is to provide a management device and the like capable of ascertaining a location where an anomaly can occur in a system. A management device according to an aspect of the present disclosure comprises: a storage unit that stores configuration information which corresponds to each constituent element of a system and which indicates a configuration of each constituent element; a first identification unit that identifies configuration information of a first constituent element in which an anomaly has occurred; and a second identification unit that, from the stored configuration information, identifies a second constituent element which corresponds to configuration information including common information between the first constituent element and the configuration information.

22 Claims, 8 Drawing Sheets

MANAGEMENT DEVICE, MANAGEMENT METHOD, AND COMPUTER-READABLE STORAGE MEDIUM

This application is a National Stage Entry of PCT/JP2021/041480 filed on Nov. 11, 2021, the contents of all of which are incorporated herein by reference, in their entirety.

TECHNICAL FIELD

The present disclosure relates to a technology of managing a system using configuration information.

BACKGROUND ART

When an anomaly occurs in the system, it is required to quickly deal with the anomaly that has occurred. PTL 1 discloses a technology of managing a system that operates a plurality of virtual servers using a configuration information database indicating the configuration of the servers. In particular, PTL 1 discloses that when a failure is detected, the servers including a server in which the failure is detected are identified from the configuration information database using an identifier (ID) of the server in which the failure is detected, and an operation management access to the identified servers is received.

CITATION LIST

Patent Literature

PTL 1: JP 2016-051399 A

SUMMARY OF INVENTION

Technical Problem

As described above, in the technology disclosed in PTL 1, when an anomaly occurs in the system, a location where the anomaly has occurred is addressed. On the other hand, there is a concern that a similar anomaly occurs in other locations in the same system. Therefore, it is required to ascertain the location where the similar anomaly may occur. In PTL 1, the description of the location where the similar anomaly may occur is not disclosed.

The present disclosure has been made in consideration of the problems described above, and one object of the present disclosure is to provide a management device and the like capable of ascertaining a location where an anomaly may occur in a system.

Solution to Problem

A management device according to one aspect of the present disclosure includes a storage unit that stores configuration information that is related to each constituent element of a system and indicates a configuration of each of the constituent elements, a first identification unit that identifies configuration information of a first constituent element which is a constituent element in which an anomaly has occurred, and a second identification unit that identifies a second constituent element which is a constituent element that is related to configuration information including information common to the configuration information of the first constituent element, from the stored configuration information.

A management method according to one aspect of the present disclosure stores configuration information that is related to each constituent element of a system and indicates a configuration of each of the constituent elements, identifies configuration information of a first constituent element which is a constituent element in which an anomaly has occurred, and identifies a second constituent element which is a constituent element that is related to configuration information including information common to the configuration information of the first constituent element, from the stored configuration information.

A computer-readable storage medium according to one aspect of the present disclosure stores a program for allowing a computer to execute processing of storing configuration information that is related to each constituent element of a system and indicates a configuration of each of the constituent elements, processing of identifying configuration information of a first constituent element which is a constituent element in which an anomaly has occurred, and processing of identifying a second constituent element which is a constituent element that is related to configuration information including information common to the configuration information of the first constituent element, from the stored configuration information.

Advantageous Effects of Invention

According to the present disclosure, it is possible to ascertain the location where the anomaly may occur in the system.

EXAMPLE EMBODIMENT

Hereinafter, example embodiments of the present disclosure will be described with reference to the drawings.

First Example Embodiment

The outline of a management device of the present disclosure will be described.

Figure 1:
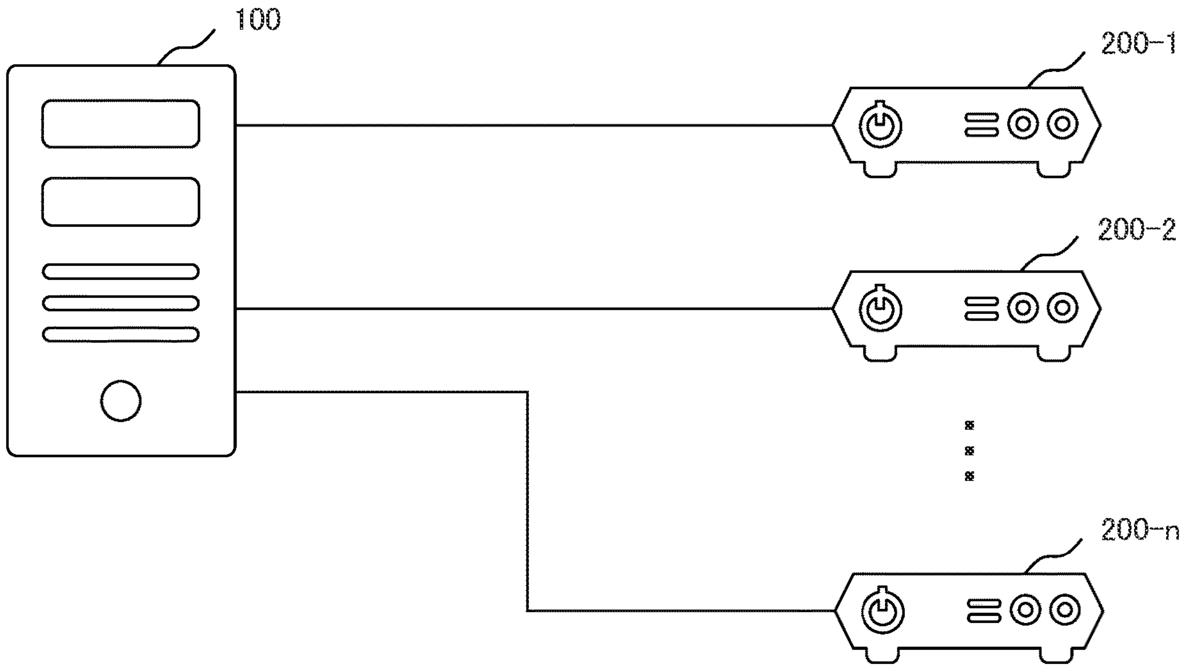
FIG. 1 is a diagram schematically illustrating an example of a configuration including a management device according to a first example embodiment of the present disclosure.

FIG. 1 is a diagram schematically illustrating an example of a configuration including a management device 100. As illustrated in FIG. 1, the management device 100 is connected to communication devices 200-1, 200-2, . . . , **200-*n* (n is a natural number of 1 or more) via a wireless or wired network such that communication is available. Here, in a case where the communication devices 200-1, 200-2, . . . , and 200-*n* are not distinguished from one another, the communication devices will be simply referred to as a communication device 200. The communication device 200 may be further connected to another communication device 200 such that communication is available to construct a network. Each of the communication devices 200** is not limited to the same device.

The management device 100 manages a system including the communication device 200. The system including the communication device 200 is a system that provides a service via a network. The communication device 200 is a device constituting the system. The communication device 200 includes a network device, a server device, a storage device, and the like. The system including the communication device 200 may be, for example, a system that constructs an in-house network of a company, or a system that controls a machine tool, a sensor, or the like used in a factory. The system including the communication device 200 may be a system that constructs a network of communication lines. In the case of constructing the network of the communication lines, the communication device 200 may be, for example, a device having the function of a base station, a core, a switch, and the like, including a radio unit (RU), a distributed unit (DU), a central unit (CU), and the like.

In the present disclosure, a resource existing in the system is referred to as a constituent element. The constituent elements include hardware and software constituting the system. The hardware is, for example, a device, a central processing unit (CPU), a memory, or the like included in the device. The software is, for example, software installed in a device. That is, the communication device 200 is one of the constituent elements, and the software installed in the communication device 200 is also one of the constituent elements.

Figure 2:
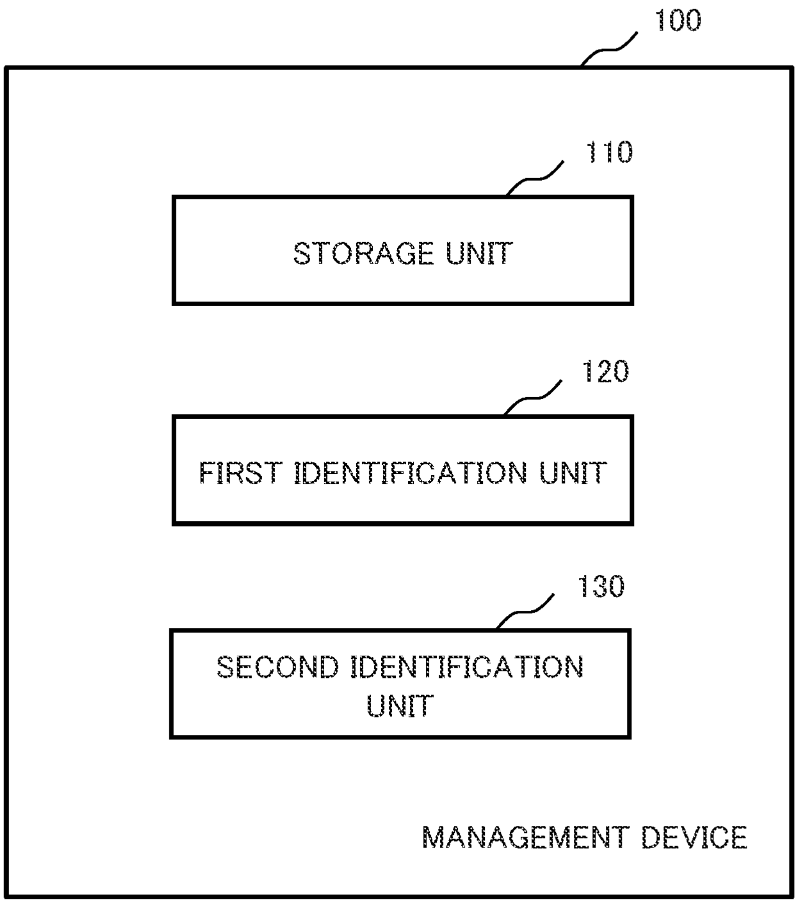
FIG. 2 is a block diagram illustrating an example of a functional configuration of the management device according to the first example embodiment of the present disclosure.

FIG. 2 is a block diagram illustrating an example of a functional configuration of the management device 100 of the first example embodiment. As illustrated in FIG. 2, the management device 100 includes a storage unit 110, a first identification unit 120, and a second identification unit 130.

The storage unit 110 stores configuration information. The configuration information is information indicating the configuration of the constituent element of the system. For example, the configuration information of the communication device 200 includes information of electronic components mounted on the communication device 200, information of a list of the software installed in the communication device 200, and the like. For example, in the case of configuration information of software, information relevant to software design, such as software version information and information of a library to be referred to, is included.

The storage unit 110 stores configuration information related to each constituent element. At this time, for example, the storage unit 110 may store the configuration information by the input of a user who operates the management device 100. In this manner, the storage unit 110 stores the configuration information that is information related to each of the constituent elements of the system and indicates the configuration of the constituent element. The storage unit 110 is an example of a storage unit.

The first identification unit 120 identifies configuration information of a constituent element in which an anomaly has occurred. For example, it is assumed that an anomaly has occurred in software executed in the communication device 200-1. In this case, for example, an alert relevant to the software in which an anomaly has occurred is notified from the communication device 200-1 to the management device 100. The first identification unit 120 identifies the configuration information of the software executed in the communication device 200-1, for example, based on such an alert, from the configuration information stored by the storage unit 110. In the present disclosure, the constituent element in which an anomaly has occurred is also referred to as a first constituent element. In this manner, the first identification unit 120 identifies the configuration information of the first constituent element that is the constituent element in which an anomaly has occurred. The first identification unit 120 is an example of a first identification unit.

The second identification unit 130 identifies a constituent element similar to the first constituent element using the configuration information identified by the first identification unit 120. The constituent element similar to the first constituent element is, for example, a constituent element in which the same anomaly may occur. Specifically, for example, the second identification unit 130 identifies configuration information relevant to the configuration information identified by the first identification unit 120. For example, the second identification unit 130 compares the configuration information of the first constituent element identified by the first identification unit 120 with the configuration information stored in the storage unit 110. Then, for example, as a result of the comparison, the second identification unit 130 identifies a constituent element related to configuration information including information common to the configuration information of the first constituent element. In the present disclosure, a constituent element identified by the second identification unit 130 is also referred to as a second constituent element. In this manner, the second identification unit 130 identifies the second constituent element that is a constituent element related to the configuration information including the information common to the configuration information of the first constituent element, from the stored configuration information. The second identification unit 130 is an example of a second identification unit.

Next, an example of the operation of the management device 100 will be described with reference to FIG. 3. Note that, in the present disclosure, each step in the flowchart is represented using a number assigned to each step, such as "S1".

Figure 3:
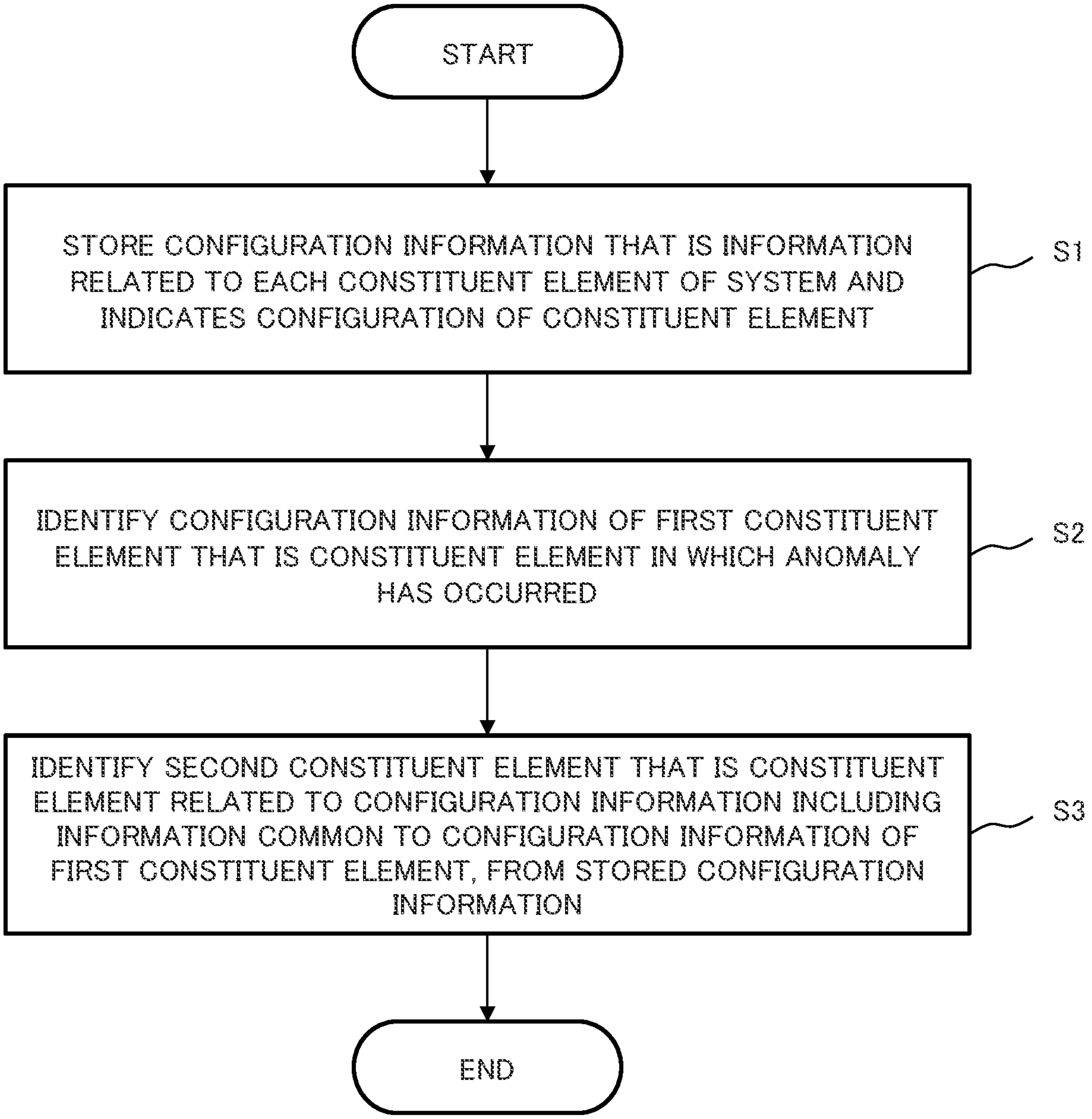
FIG. 3 is a flowchart illustrating an example of an operation of the management device according to the first example embodiment of the present disclosure.

FIG. 3 is a flowchart illustrating an example of the operation of the management device 100. The storage unit 110 stores the configuration information that is the information related to each of the constituent elements of the system and indicates the configuration of the constituent element (S1). The first identification unit 120 identifies the configuration information of the first constituent element that is the constituent element in which an anomaly has occurred (S2). The second identification unit 130 identifies the second constituent element that is the constituent element related to the configuration information including the information common to the configuration information of the first constituent element, from the stored configuration information (S3).

As described above, the management device 100 according to the first example embodiment stores the configuration information that is the information related to each of the constituent elements of the system and indicates the configuration of the constituent element, and identifies the configuration information of the first constituent element that is the constituent element in which an anomaly occurs. Then, the management device 100 identifies the second constituent element that is the constituent element related to the configuration information including the information common to the configuration information of the first constituent element, from the stored configuration information. When the configuration information of each of a plurality of constituent elements includes common information, there is a high possibility that a similar anomaly occurs in each of the constituent elements. With the above configuration, the management device 100 may identify the constituent element in which an anomaly has occurred and the constituent element in which a similar anomaly may occur. That is, the management device 100 of the first example embodiment may ascertain a location where an anomaly may occur, in the system.

Second Example Embodiment

Next, a management device according to a second example embodiment will be described. In the second example embodiment, the management device 100 described in the first example embodiment will be described in more detail.

Figure 4:
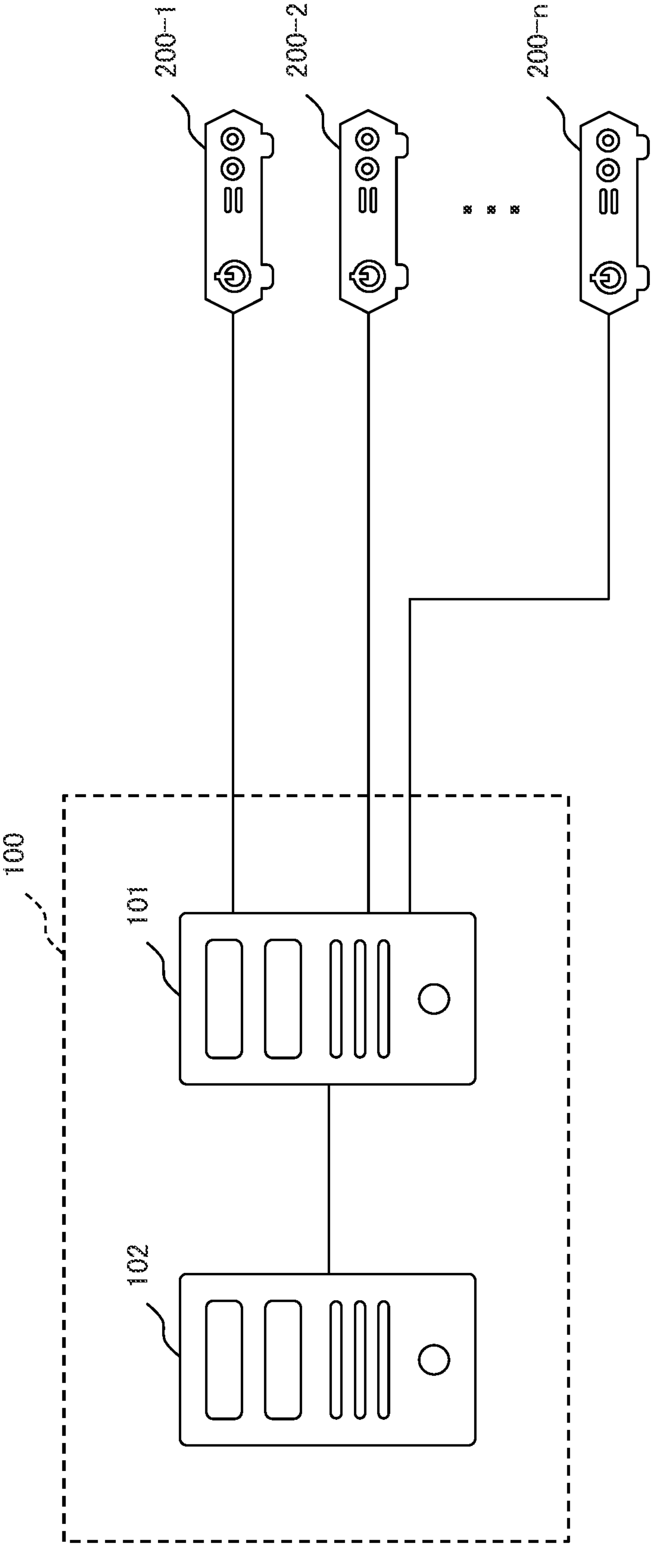
FIG. 4 is a diagram schematically illustrating an example of a configuration including a management device according to a second example embodiment of the present disclosure.

FIG. 4 is a diagram schematically illustrating an example of a configuration including the management device 100. As illustrated in FIG. 4, the management device 100 may include a shared server 101 and a countermeasure implementation server 102. The shared server 101 is connected to the countermeasure implementation server 102 and the communication device 200 such that communication is available. The shared server 101 may be further connected to a terminal (not illustrated) of the user who manages the management device 100 such that communication is available.

Details of Management Device 100

Figure 5:
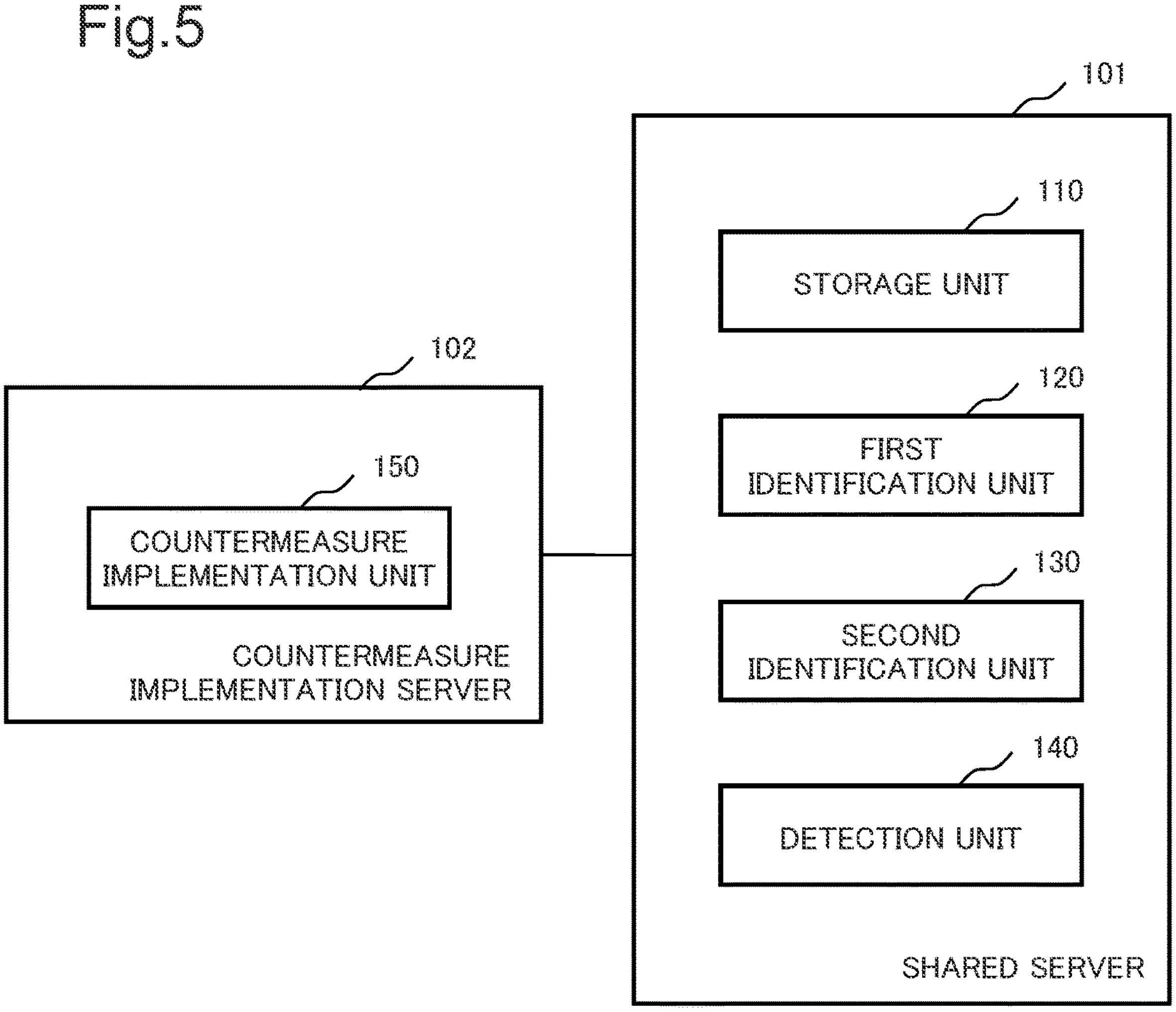
FIG. 5 is a block diagram illustrating an example of a functional configuration of the management device according to the second example embodiment of the present disclosure.

FIG. 5 is a block diagram illustrating an example of a functional configuration of the management device 100 according to the second example embodiment. As illustrated in FIG. 5, the shared server 101 includes the storage unit 110, the first identification unit 120, the second identification unit 130, and a detection unit 140. In addition, the countermeasure implementation server 102 includes a countermeasure implementation unit 150.

The storage unit 110 stores the configuration information related to the constituent element of the system. The configuration information includes, for example, system configuration information, device configuration information, model configuration information, and software configuration information. The system configuration information is information indicating the configuration of the system. For example, the system configuration information includes information indicating each of the communication devices 200 included in the system. The device configuration information is information uniquely created for each of the communication devices 200. The device configuration information indicates information set in the communication device 200. For example, the device configuration information may include information such as an address set in the device. The storage unit 110 stores device configuration information related to each of the communication devices 200.

The model configuration information is information relevant to an element mounted on the communication device 200. The element is, for example, an electronic component such as a CPU and a memory, software, and the like. That is, the model configuration information includes, for example, information relevant to an electronic component mounted on the communication device 200 and information indicating the software installed in the communication device 200. Not limited to this, the model configuration information may include information such as a model number and a serial number of the communication device. The model configuration information may be information created for each production lot of the device. That is, the model configuration information related to the communication devices 200 produced in the same production lot may be the same. The storage unit 110 stores model configuration information related to each of the communication devices 200.

The software configuration information is information indicating the configuration of the software. Hereinafter, the software configuration information is also referred to as SW configuration information. The SW configuration information may be information created for each version of the software. The SW configuration information is, for example, a software bill of materials (SBOM). The SW configuration information may include authenticity information and vulnerability information of the software. The storage unit 110 stores SW configuration information related to each piece of software included in the communication device 200.

Figure 6:
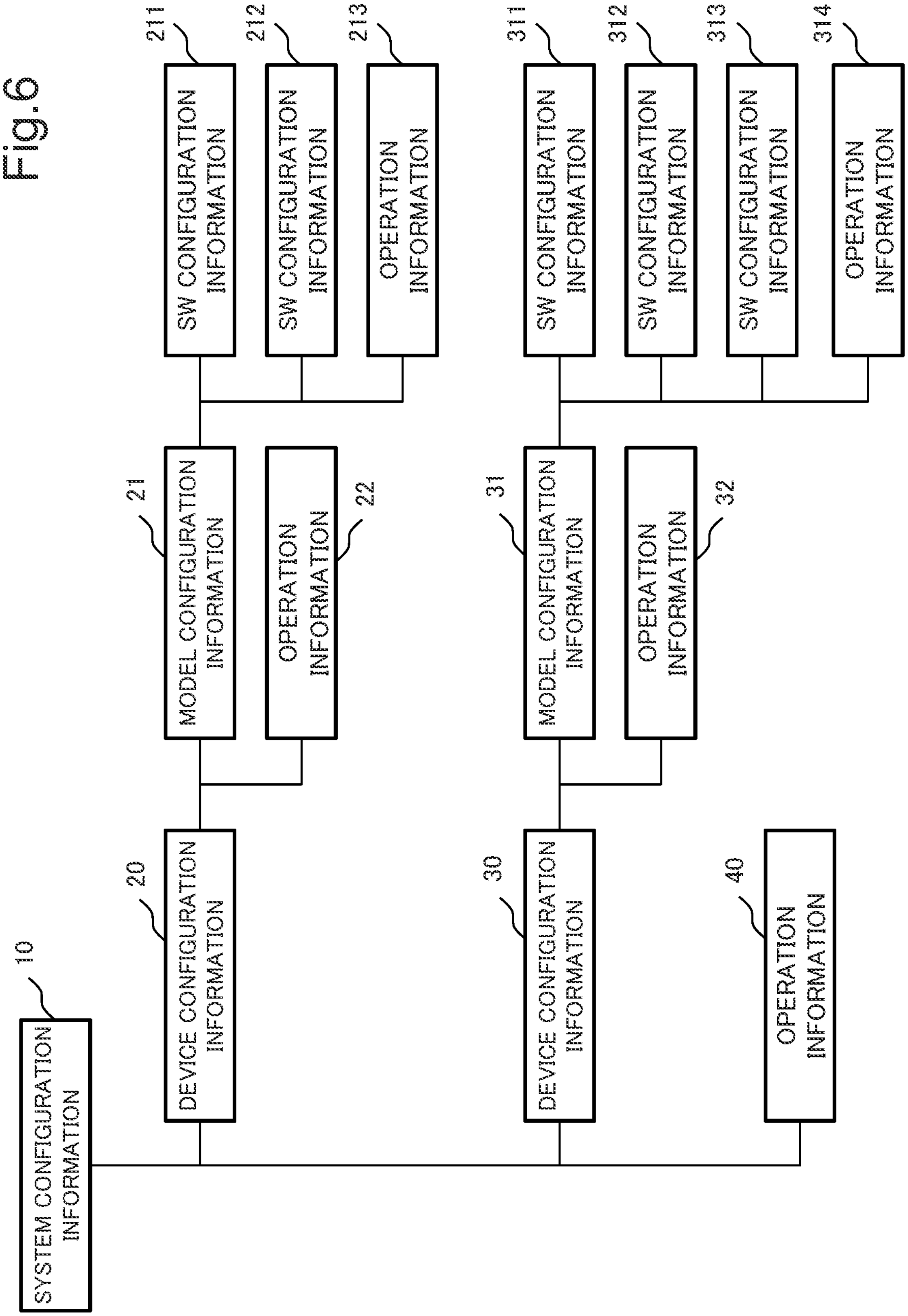
FIG. 6 is a diagram illustrating an example of a relationship of configuration information according to the second example embodiment of the present disclosure.

Here, the storage unit 110 stores related configuration information in association with each other. Processing of associating the configuration information is, for example, processing of including information that is accessible to the related configuration information in the configuration information. FIG. 6 is a diagram illustrating an example of a relationship of the configuration information stored in the storage unit 110. For example, it is assumed that the communication device 200-1 and the communication device 200-2 are included in the system. In this case, system configuration information 10 is associated with device configuration information 20 related to the communication device 200-1 and device configuration information 30 related to the communication device 200-2. The device configuration information 20 is associated with model configuration information 21 related to the communication device 200-1. Then, the model configuration information 21 is associated with SW configuration information pieces 211 and 212 related to each piece of the software installed in the communication device 200-1. Similarly, the device configuration information 30 is associated with model configuration information 31 related to the communication device 200-2. Then, the model configuration information 31 is associated with SW configuration information pieces 311, 312, and 313 related to each piece of the software installed in the communication device 200-2. In this manner, the storage unit 110 stores configuration information pieces relevant to the same device, among the plurality of devices, in association with each other.

For example, it is assumed that an anomaly has occurred in the software of the communication device 200-1. Here, in a case where another device is of the same type as the communication device 200-1, there is a high possibility that the another device has the same software as the software in which an anomaly has occurred. As described above, by storing the constituent elements in association with each other, it is also possible to quickly identify the same type of device as the device in which an anomaly has occurred.

As illustrated in FIG. 6, the storage unit 110 may further associate and store operation information. In the example of FIG. 6, operation information 40 is associated with the device configuration information pieces 20 and 30, operation information 22 is associated with the model configuration information 21, and operation information 213 is associated with the SW configuration information pieces 211 and 212. Each piece of operation information includes log information and an inspection result relevant to each piece of configuration information. For example, the operation information 213 may include an operation log, an update history, and the like, relevant to the software related to each of the SW configuration information pieces 211 and 212.

The first identification unit 120 identifies the constituent element in which an anomaly has occurred as the first constituent element and identifies the configuration information of the first constituent element. At this time, the first identification unit 120 identifies the constituent element in which an anomaly has occurred based on the detection result of the detection unit 140.

The detection unit 140 detects an anomaly. Specifically, the detection unit 140 detects an anomaly based on the information acquired from the communication device 200. For example, the detection unit 140 may detect a failure of a constituent element of the communication device 200, from a signal periodically acquired from the communication device 200. Furthermore, for example, the detection unit 140 may detect an anomaly by acquiring information indicating that an unauthorized access, a cyberattack, or the like with respect to the communication device 200 has occurred, from the communication device 200. The detection unit 140 may be enabled by, for example, an intrusion detection system (IDS) or an intrusion prevention system (IPS). A method for detecting an anomaly is not limited to a specific method. The method for detecting an anomaly may be any method as long as the method may recognize the location where an anomaly has occurred and the type of anomaly. When detecting an anomaly, the detection unit 140 may generate information relevant to the anomaly. The information relevant to the anomaly includes information indicating the constituent element in which an anomaly has occurred and the type of anomaly that has occurred. In this manner, the detection unit 140 detects an anomaly that has occurred in the constituent element of the system. The detection unit 140 is an example of a detection unit.

When the detection unit detects an anomaly, the first identification unit 120 sets a constituent element in which the detected anomaly has occurred as the first constituent element and identifies configuration information related to the first constituent element. For example, when the detection unit 140 detects that an anomaly has occurred in the software installed in the communication device 200-1, the first identification unit 120 identifies configuration information of the software from the configuration information stored in the storage unit 110.

The second identification unit 130 identifies a constituent element similar to the first constituent element as the second constituent element. First, the second identification unit 130 identifies configuration information including information common to the configuration information of the first constituent element, from the configuration information stored in the storage unit 110. For example, the second identification unit 130 compares the configuration information of the first constituent element with each piece of the configuration information stored in the storage unit 110. As a result of the comparison, the second identification unit 130 identifies the configuration information including the information common to the configuration information of the first constituent element. At this time, the second identification unit 130 may identify the same configuration information as the configuration information of the first constituent element, from the stored configuration information. For example, it is assumed that an anomaly has occurred in the behavior of the communication device 200-1. In this case, the second identification unit 130 identifies model configuration information of another device having the same model configuration information as the model configuration information of the communication device 200-1.

In addition, the second identification unit 130 may identify the configuration information in which the information relevant to an anomaly is common, among the information included in the configuration information of the first constituent element, from the stored configuration information. For example, it is assumed that in predetermined software, an anomaly has occurred in a library referred to by the predetermined software. In this case, the second identification unit 130 identifies SW configuration information of another software that refers to the predetermined library, among the stored configuration information. For example, when an anomaly has occurred in the predetermined software, the second identification unit 130 may identify SW configuration information including the same version information as version information of the predetermined software, from the stored configuration information.

The second identification unit 130 may calculate a similarity between the configuration information of the first constituent element and each piece of the configuration information stored in the storage unit 110. At this time, the second identification unit 130 determines, for example, whether to match up with each item of the configuration information. Then, for example, the second identification unit 130 may calculate a ratio of matched items among all the items as the similarity. As described above, the second identification unit 130 is based on the number of pieces of information common to the configuration information of the first constituent element and the configuration information stored in the storage unit 110. The similarity is calculated. A method for calculating the similarity is not limited to this example. Then, the second identification unit 130 identifies a constituent element having a similarity equal to or more than a threshold value, among the stored configuration information.

Then, the second identification unit 130 identifies the constituent element related to the configuration information including the information common to the configuration information of the first constituent element, as the second constituent element. The second identification unit 130 may output the information relevant to the second constituent element to a terminal (not illustrated) connected to the management device 100. For example, the second identification unit 130 may display information indicating the second constituent element such as the name, the ID, or the like of the second constituent element and the configuration information of the second constituent element on a display included in the terminal.

The countermeasure implementation unit 150 of the countermeasure implementation server 102 implements a countermeasure for an anomaly via the shared server 101. When an anomaly is detected by the detection unit 140, the countermeasure implementation unit 150 may implement a countermeasure for the constituent element in which an anomaly has occurred (that is, the first constituent element). The countermeasure implementation unit 150 may implement a countermeasure for the constituent element (that is, the second constituent element) identified by the second identification unit 130. The countermeasure implementation unit 150 may implement a countermeasure according to an instruction from the user who operates the management device 100.

For example, when an anomaly has occurred in the communication device 200-1, the countermeasure implementation unit 150 may stop a service relevant to the communication device 200-1. When an anomaly occurs in the software and there is a correction program of the software, the countermeasure implementation unit 150 may apply the correction program and update the software. At this time, the countermeasure implementation unit 150 may similarly update software (that is, the constituent elements identified by the second identification unit 130) similar to the software in which an anomaly has occurred. As described above, the countermeasure implementation unit 150 may implement, on the second constituent element, a countermeasure related to the anomaly that has occurred in the first constituent element. The countermeasure implementation unit 150 is an example of a countermeasure implementation unit.

When the software is updated, the SW configuration information is changed. When the software is updated, the countermeasure implementation unit 150 updates the SW configuration information of the updated software, among the configuration information stored by the storage unit 110.

In addition, the countermeasure implementation unit 150 may implement a countermeasure in consideration of the influence on the system. For example, in a case where the software is updated, it is assumed that it is necessary to stop a service provided in the software. Here, for example, the countermeasure implementation unit 150 may perform a countermeasure capable of continuing the service provided in the software identified as the second constituent element. Specifically, for example, the countermeasure implementation unit 150 may temporarily stop the authority to change the setting of the system to an administrator of the system, or restrict the administrator from remotely connecting to the console of the system. The countermeasure capable of continuing the service may include a countermeasure for stopping the service. For example, the countermeasure capable of continuing the service includes a countermeasure that substantially has little influence on the provision of the service, such as stopping the service for 1 minute or stopping the service outside the service providing time. As described above, the countermeasure implementation unit 150 may implement, on the second constituent element, the countermeasure capable of continuing the service relevant to the second constituent element.

In addition, the countermeasure implementation unit 150 may implement a countermeasure for the second constituent element based on the operation information. For example, the countermeasure implementation unit 150 refers to the operation information associated with the configuration information of the second constituent element. The operation information may include a history on which an inspection relevant to an anomaly has been implemented. In a case where the inspection relevant to an anomaly has been implemented, the countermeasure implementation unit 150 may defer the implementation of the countermeasure for the second constituent element. On the other hand, when the inspection is not performed with respect to the second constituent element, the countermeasure implementation unit 150 may implement the countermeasure for the second constituent element. As described above, the countermeasure implementation unit 150 may determine a countermeasure to be implemented on the second constituent element according to whether the inspection relevant to the anomaly that has occurred in the first constituent element has been performed with respect to the second constituent element.

Operation Example of Management Device 100

Figure 7:
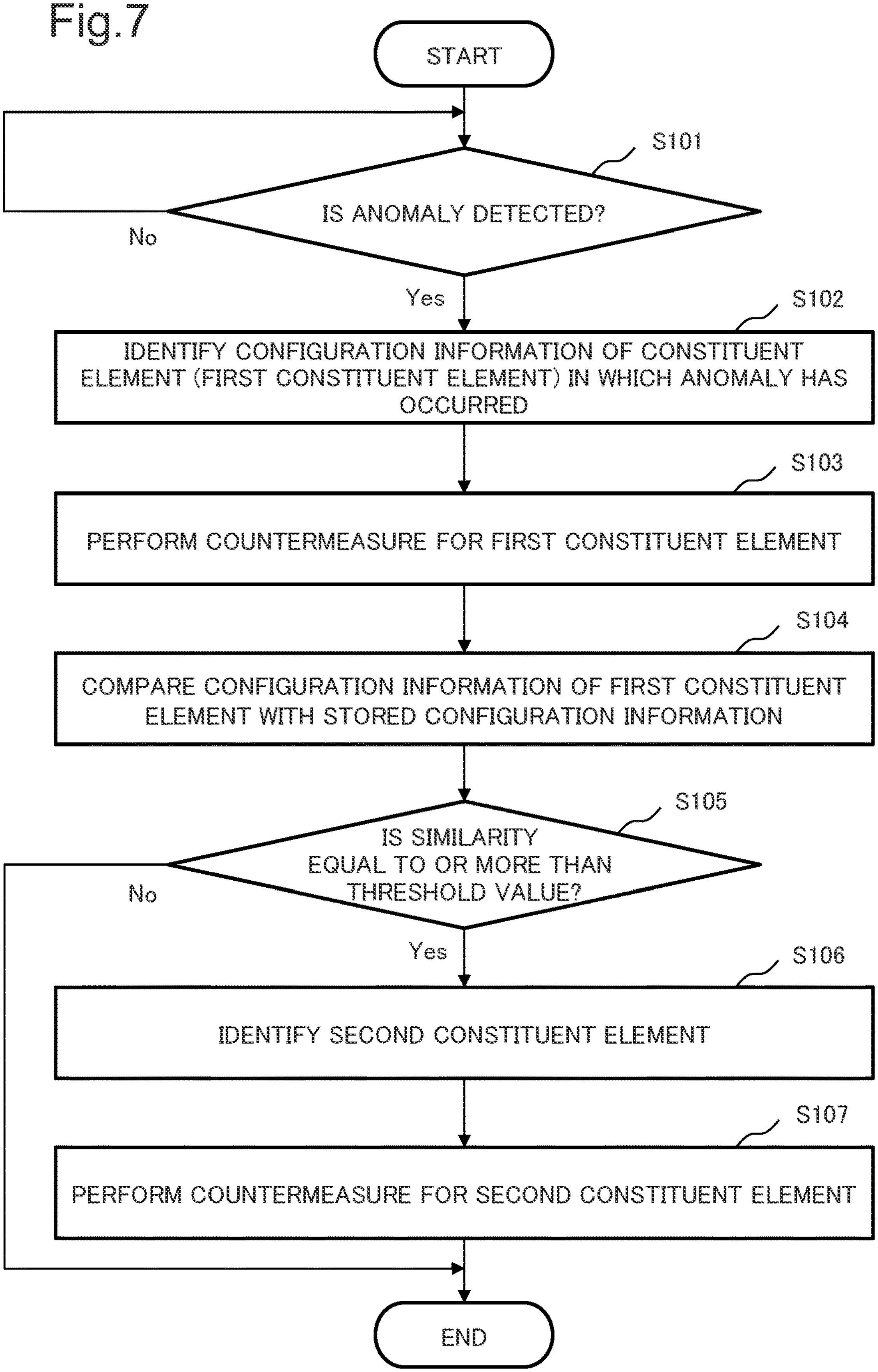
FIG. 7 is a flowchart illustrating an example of an operation of the management device according to the second example embodiment of the present disclosure.

Next, an example of the operation of the management device 100 according to the second example embodiment will be described with reference to FIG. 7. FIG. 7 is a flowchart illustrating an example of the operation of the management device 100.

When the detection unit 140 detects an anomaly ("Yes" in S101), the first identification unit 120 identifies the configuration information of the constituent element in which an anomaly has occurred (that is, the first constituent element) (S102). When the detection unit 140 does not detect an anomaly ("No" in S101), the management device 100 may not proceed with the processing. After the processing of S102, the countermeasure implementation unit 150 performs a countermeasure for the first constituent element (S103).

Next, the second identification unit 130 compares the configuration information of the first constituent element with the configuration information stored in the storage unit 110 (S104). When there is the configuration information having the similarity equal to or more than the threshold value ("Yes" in S105), the second identification unit 130 identifies the constituent element related to the configuration information having the similarity equal to or more than the threshold value as the second constituent element. Then, the countermeasure implementation unit 150 performs the countermeasure for the second constituent element (S107).

This operation example is an example, and the operation of the management device 100 is not limited to this example. For example, the processing of S103 may be performed after the processing of S104. Instead of the processing of S105 and S106, processing of identifying a constituent element related to configuration information in which the configuration information of the first constituent element and specific information are common as the second constituent element may be performed.

As described above, the management device 100 according to the second example embodiment stores the configuration information that is the information related to each of the constituent elements of the system and indicates the configuration of the constituent element, and identifies the configuration information of the first constituent element that is the constituent element in which an anomaly occurs. Then, the management device 100 identifies the second constituent element that is the constituent element related to the configuration information including the information common to the configuration information of the first constituent element, from the stored configuration information. When the configuration information of each of a plurality of constituent elements includes common information, there is a high possibility that a similar anomaly occurs in each of the constituent elements. With the above configuration, the management device 100 may identify the constituent element in which an anomaly has occurred and the constituent element in which a similar anomaly may occur. That is, the management device 100 of the first example embodiment may ascertain a location where an anomaly may occur, in the system.

The management device 100 according to the second example embodiment may calculate a similarity based on the number of pieces of information common to the configuration information of the first constituent element and the stored configuration information, and identify, as the second constituent element, a constituent element related to configuration information of which the calculated similarity is equal to or more than a threshold value, among the stored configuration information. For example, even in a case where a predetermined constituent element is not exactly the same as the constituent element in which an anomaly has occurred, the predetermined constituent element may behave as with the constituent element in which an anomaly has occurred. The management device 100 may identify such a constituent element.

In addition, in the second example embodiment, the constituent elements of the system include a plurality of devices and software included in each of the plurality of devices, and the management device 100 stores configuration information pieces relevant to the same device, among the plurality of devices, in association with each other. With this configuration, the management device 100 may quickly identify the configuration information of the device in which an anomaly is detected.

The management device 100 may implement, on the second constituent element, the countermeasure related to the anomaly that has occurred in the first constituent element. As a result, the management device 100 may perform a preventive countermeasure for the constituent element in which an anomaly does not occur but an anomaly may occur. That is, the management device 100 may perform the countermeasure for the anomaly even in a location where the anomaly is not actualized, in the system.

Modification Example 1

In the above example embodiments, the configuration has been described in which the management device 100 includes the shared server 101 and the countermeasure implementation server 102. The configuration of the management device 100 is not limited to this example. For example, the management device 100 may include one server. In this case, the storage unit 110, the first identification unit 120, the second identification unit 130, the detection unit 140, and the countermeasure implementation unit 150 may be enabled in one server. In addition, the management device 100 may include three or more servers. In this case, the storage unit 110, the first identification unit 120, the second identification unit 130, the detection unit 140, and the countermeasure implementation unit 150 may be enabled in any of the three or more servers.

Modification Example 2

In the above example embodiments, an example has been described in which the configuration information of the first constituent element is compared with the configuration information stored in the storage unit 110 when the second constituent element is identified. When an attack on the software is detected and the vulnerability information in each piece of software is included in the configuration information, the second constituent element may be identified based on the vulnerability information.

For example, the second identification unit 130 compares the vulnerability information included in the configuration information of the first constituent element with the vulnerability information included in the stored configuration information. Then, in a case where there is configuration information including vulnerability information in which the type and the number of vulnerabilities match at a predetermined rate or more, the second identification unit 130 identifies a constituent element related to the configuration information as the second constituent element.

In this manner, the management device 100 may calculate the similarity between the vulnerability information included in the configuration information of the first constituent element and the vulnerability information included in each of the stored configuration information pieces, and identify, as the second constituent element, the constituent element related to the configuration information of which the calculated similarity is equal to or more than the threshold value, among the stored configuration information.

Modification Example 3

In a case where the vulnerability information of the software is disclosed, the management device 100 may identify the constituent element based on the disclosed vulnerability information. For example, the second identification unit 130 identifies the configuration information having the vulnerability from the configuration information stored in the storage unit 110, based on the disclosed vulnerability information. Then, the second identification unit 130 identifies a constituent element related to the identified configuration information as the second constituent element.

When the vulnerability information is disclosed, it is necessary to quickly address the vulnerability. On the other hand, since the management device 100 manages the configuration information pieces relevant to the same device in association with each other, it is possible to quickly identify the constituent element having the vulnerability.

Configuration Example of Hardware of Management Device

Figure 8:
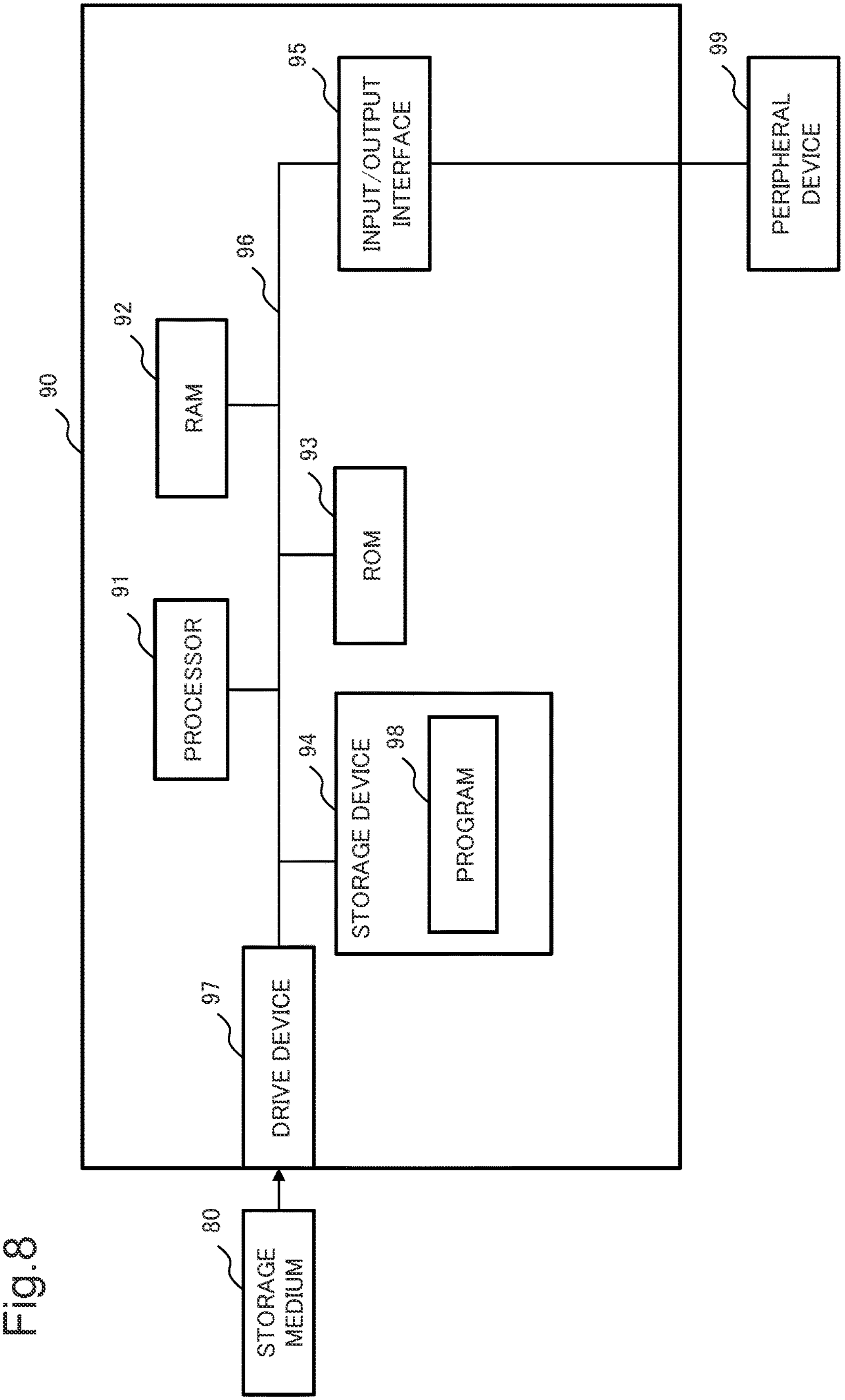
FIG. 8 is a block diagram illustrating an example of a hardware configuration of a computer device that enables the management devices according to the first and second example embodiments of the present disclosure.

The hardware constituting the management device according to the above-described first and second example embodiments will be described. FIG. 8 is a block diagram illustrating an example of a hardware configuration of a computer device that enables the management device of each of the example embodiments. In the computer device 90, the management device and the management method described in each of the example embodiments and each of the modification examples are enabled.

As illustrated in FIG. 8, the computer device 90 includes a processor 91, a random access memory (RAM) 92, a read only memory (ROM) 93, a storage device 94, an input/output interface 95, a bus 96, and a drive device 97. The management device may be enabled by a plurality of electric circuits.

The storage device 94 stores a program (computer program) 98. The processor 91 executes the program 98 of the management device by using the RAM 92. Specifically, for example, the program 98 includes a program for allowing a computer to execute the processing illustrated in FIG. 3 and FIG. 7. When the processor 91 executes the program 98, the function of each constituent of the management device is enabled. The program 98 may be stored in the ROM 93. The program 98 may be recorded in a storage medium 80 and read using the drive device 97, or may be transmitted from an external device (not illustrated) to the computer device 90 via a network (not illustrated).

The input/output interface 95 exchanges data with a peripheral device (a keyboard, a mouse, a display device, or the like) 99. The input/output interface 95 functions as a unit that acquires or outputs data. The bus 96 connects the constituents to each other.

There are various modification examples of a method for enabling the management device. For example, the management device can be enabled as a dedicated device. In addition, the management device can be enabled based on a combination of a plurality of devices.

A processing method for recording, in a storage medium, a program for enabling each of the constituents in the functions of each of the example embodiments, reading the program recorded in the storage medium as a code, and executing the program in a computer is also included in the scope of each of the example embodiments. That is, a computer-readable storage medium is also included in the scope of each of the example embodiments. A storage medium in which the above-described program is recorded and the program itself is also included in each of the example embodiments.

The storage medium is, for example, a floppy (Registered Trademark) disk, a hard disk, an optical disk, a magneto-optical disk, a compact disc (CD)-ROM, a magnetic tape, a nonvolatile memory card, or a ROM, but is not limited to this example. The program recorded in the storage medium is not limited to a program that executes processing alone, and programs that are operated on an operating system (OS) to execute processing in cooperation with other software and the function of an extension board are also included in the scope of each of the example embodiments.

While the disclosure has been particularly shown and described with reference to exemplary embodiments thereof, the disclosure is not limited to these embodiments. It will be understood by those of ordinary skill in the art that various changes in form and details may be made therein without departing from the spirit and scope of the present disclosure as defined by the claims.

The above-described example embodiments and modification examples can be appropriately combined.

The whole or part of the example embodiments disclosed above can be described as, but not limited to, the following supplementary notes.

SUPPLEMENTARY NOTES

Supplementary Note 1

A management device including:

a storage means configured to store configuration information that is related to each constituent element of a system and indicates a configuration of each of the constituent elements;

a first identification means configured to identify configuration information of a first constituent element which is a constituent element in which an anomaly has occurred; and a second identification means configured to identify a second constituent element which is a constituent element that is related to configuration information including information common to the configuration information of the first constituent element, from the stored configuration information.

Supplementary Note 2

The management device according to supplementary note 1, in which the second identification means calculates a similarity based on the number of pieces of information common to the configuration information of the first constituent element and the stored configuration information, and identifies, as the second constituent element, a constituent element related to configuration information of which the calculated similarity is equal to or more than a threshold value, among the stored configuration information.

Supplementary Note 3

The management device according to supplementary note 1 or 2, in which the second identification means calculates a similarity between vulnerability information included in the configuration information of the first constituent element and vulnerability information included in each of the stored configuration information pieces, and identifies, as the second constituent element, a constituent element related to configuration information of which the calculated similarity is equal to or more than a threshold value, among the stored configuration information.

Supplementary Note 4

The management device according to any one of supplementary notes 1 to 3, in which the constituent element of the system includes a plurality of devices and software included in each of the plurality of devices, and the storage means stores configuration information pieces relevant to the same device, among the plurality of devices, in association with each other.

Supplementary Note 5

The management device according to any one of supplementary notes 1 to 4, further including a detection means configured to detect an anomaly that has occurred in the constituent element of the system, in which the first identification means identifies, as the configuration information of the first constituent element, configuration information of the constituent element in which the detected anomaly has occurred.

Supplementary Note 6

The management device according to any one of supplementary notes 1 to 5, further including a countermeasure implementation means configured to implement, on the second constituent element, a countermeasure related to an anomaly that has occurred in the first constituent element.

Supplementary Note 7

The management device according to supplementary note 6, in which the countermeasure implementation means implements, on the second constituent element, a countermeasure capable of continuing a service relevant to the second constituent element.

Supplementary Note 8

The management device according to supplementary note 6 or 7, in which the countermeasure implementation means determines a countermeasure to be implemented on the second constituent element according to whether an inspection relevant to an anomaly that has occurred in the first constituent element is performed with respect to the second constituent element.

Supplementary Note 9

A management method including:

storing configuration information that is related to each constituent element of a system and indicates a configuration of each of the constituent elements;

identifying configuration information of a first constituent element which is a constituent element in which an anomaly has occurred; and identifying a second constituent element which is a constituent element that is related to configuration information including information common to the configuration information of the first constituent element, from the stored configuration information.

Supplementary Note 10

The management method according to supplementary note 9, in which in the identifying the second constituent element, a similarity is calculated based on the number of pieces of information common to the configuration information of the first constituent element and the stored configuration information, and a constituent element related to configuration information of which the calculated similarity is equal to or more than a threshold value, among the stored configuration information, is identified as the second constituent element.

Supplementary Note 11

The management method according to supplementary note 9 or 10, in which in the identifying the second constituent element, a similarity between vulnerability information included in the configuration information of the first constituent element and vulnerability information included in each of the stored configuration information pieces is calculated, and a constituent element related to configuration information of which the calculated similarity is equal to or more than a threshold value, among the stored configuration information, is identified as the second constituent element.

Supplementary Note 12

The management method according to any one of supplementary notes 9 to 11, in which the constituent element of the system includes a plurality of devices and software included in each of the plurality of devices, and in the storing the configuration information, configuration information pieces relevant to the same device, among the plurality of devices, are stored in association with each other.

Supplementary Note 13

The management method according to any one of supplementary notes 9 to 12, further including detecting an anomaly that has occurred in the constituent element of the system, in which in the identifying the configuration information of the first constituent element, configuration information of the constituent element in which the detected anomaly has occurred is identified as the configuration information of the first constituent element.

Supplementary Note 14

The management method according to any one of supplementary notes 9 to 13, further including implementing, on the second constituent element, a countermeasure related to an anomaly that has occurred in the first constituent element.

[Supplementary Note 15]

The management method according to supplementary note 14, in which in the implementing the countermeasure, a countermeasure capable of continuing a service relevant to the second constituent element is implemented on the second constituent element.

Supplementary Note 16

The management method according to supplementary note 14 or 15, in which in the implementing the countermeasure, a countermeasure to be implemented on the second constituent element is determined according to whether an inspection relevant to an anomaly that has occurred in the first constituent element is performed with respect to the second constituent element.

Supplementary Note 17

A computer-readable storage medium storing a program for allowing a computer to execute:

processing of storing configuration information that is related to each constituent element of a system and indicates a configuration of each of the constituent elements;

processing of identifying configuration information of a first constituent element which is a constituent element in which an anomaly has occurred; and processing of identifying a second constituent element which is a constituent element that is related to configuration information including information common to the configuration information of the first constituent element, from the stored configuration information.

Supplementary Note 18

The computer-readable storage medium according to supplementary note 17, in which in the processing of identifying the second constituent element, a similarity is calculated based on the number of pieces of information common to the configuration information of the first constituent element and the stored configuration information, and a constituent element related to configuration information of which the calculated similarity is equal to or more than a threshold value, among the stored configuration information, is identified as the second constituent element.

Supplementary Note 19

The computer-readable storage medium according to supplementary note 17 or 18, in which in the processing of identifying the second constituent element, a similarity between vulnerability information included in the configuration information of the first constituent element and vulnerability information included in each of the stored configuration information pieces is calculated, and a constituent element related to configuration information of which the calculated similarity is equal to or more than a threshold value, among the stored configuration information, is identified as the second constituent element.

Supplementary Note 20

The computer-readable storage medium according to any one of supplementary notes 17 to 19, in which the constituent element of the system includes a plurality of devices and software included in each of the plurality of devices, and in the processing of storing, configuration information pieces relevant to the same device, among the plurality of devices, are stored in association with each other.

Supplementary Note 21

The computer-readable storage medium according to any one of supplementary notes 17 to 20, storing the program for allowing the computer to further execute processing of detecting an anomaly that has occurred in the constituent element of the system, in which in the processing of identifying the configuration information of the first constituent element, configuration information of the constituent element in which the detected anomaly has occurred is identified as the configuration information of the first constituent element.

Supplementary Note 22

The computer-readable storage medium according to any one of supplementary notes 17 to 21, storing the program for allowing the computer to further execute processing of implementing, on the second constituent element, a countermeasure related to an anomaly that has occurred in the first constituent element.

Supplementary Note 23

The computer-readable storage medium according to supplementary note 22, in which in the processing of implementing, a countermeasure capable of continuing a service relevant to the second constituent element is implemented on the second constituent element.

Supplementary Note 24

The computer-readable storage medium according to supplementary note 22 or 23, in which in the processing of implementing, with reference to operation information related to the second constituent element, a countermeasure to be implemented on the second constituent element is determined according to whether an inspection relevant to an anomaly that has occurred in the first constituent element is performed with respect to the second constituent element.

REFERENCE SIGNS LIST

100 management device
101 shared server
102 countermeasure implementation server
110 storage unit
120 first identification unit
130 second identification unit
140 detection unit
150 countermeasure implementation unit
200 communication device

What is claimed is:

1. A management device comprising:

a memory storing instructions; and at least one processor configured to execute the instructions to:

store configuration information that is related to each constituent element of a system and indicates a configuration of each of the constituent elements;

identify configuration information of a first constituent element which is a constituent element in which an anomaly has occurred;

identify a second constituent element which is a constituent element that is related to configuration information including information common to the configuration information of the first constituent element, from the stored configuration information; and implement, on the second constituent element, a countermeasure related to an anomaly that has occurred in the first constituent element.

2. The management device according to claim 1, wherein the at least one processor is further configured to execute the instructions to:

calculate a similarity based on the number of pieces of information common to the configuration information of the first constituent element and the stored configuration information; and identify, as the second constituent element, a constituent element related to configuration information of which the calculated similarity is equal to or more than a threshold value, among the stored configuration information.

3. The management device according to claim 1 wherein the at least one processor is further configured to execute the instructions to:

calculate a similarity between vulnerability information included in the configuration information of the first constituent element and vulnerability information included in each of the stored configuration information pieces; and identify, as the second constituent element, a constituent element related to configuration information of which the calculated similarity is equal to or more than a threshold value, among the stored configuration information.

4. The management device according to claim 1, wherein the constituent element of the system includes a plurality of devices and software included in each of the plurality of devices, and the at least one processor is further configured to execute the instructions to store configuration information pieces relevant to the same device, among the plurality of devices, in association with each other.

5. The management device according to claim 1, wherein the at least one processor is further configured to execute the instructions to:

detect an anomaly that has occurred in the constituent element of the system; and identify, as the configuration information of the first constituent element, configuration information of the constituent element in which the detected anomaly has occurred.

6. The management device according to claim 1, wherein the at least one processor is further configured to execute the instructions to:

implement, on the second constituent element, a countermeasure capable of continuing a service relevant to the second constituent element.

7. The management device according to claim 1, wherein the at least one processor is further configured to execute the instructions to:

determine a countermeasure to be implemented on the second constituent element according to whether an inspection relevant to an anomaly that has occurred in the first constituent element is performed with respect to the second constituent element.

8. The management device according to claim 1, wherein the first constituent element and the second constituent element are devices operating based on installed software, the anomaly is an unauthorized access or a cyberattack, and the at least one processor is further configured to execute the instructions to:

control the first constituent element and the second constituent element to stop the software, or to apply a correction program and update the software.

9. A management method comprising:

storing configuration information that is related to each constituent element of a system and indicates a configuration of each of the constituent elements;

identifying configuration information of a first constituent element which is a constituent element in which an anomaly has occurred;

identifying a second constituent element which is a constituent element that is related to configuration information including information common to the configuration information of the first constituent element, from the stored configuration information; and implementing, on the second constituent element, a countermeasure related to an anomaly that has occurred in the first constituent element.

10. The management method according to claim 9, wherein in the identifying the second constituent element, a similarity is calculated based on the number of pieces of information common to the configuration information of the first constituent element and the stored configuration information, and a constituent element related to configuration information of which the calculated similarity is equal to or more than a threshold value, among the stored configuration information, is identified as the second constituent element.

11. The management method according to claim 9, wherein in the identifying the second constituent element, a similarity between vulnerability information included in the configuration information of the first constituent element and vulnerability information included in each of the stored configuration information pieces is calculated, and a constituent element related to configuration information of which the calculated similarity is equal to or more than a threshold value, among the stored configuration information, is identified as the second constituent element.

12. The management method according to claim 9, wherein the constituent element of the system includes a plurality of devices and software included in each of the plurality of devices, and in the storing the configuration information, configuration information pieces relevant to the same device, among the plurality of devices, are stored in association with each other.

13. The management method according to claim 9, wherein the method further comprises detecting an anomaly that has occurred in the constituent element of the system, and in the identifying the configuration information of the first constituent element, configuration information of the constituent element in which the detected anomaly has occurred is identified as the configuration information of the first constituent element.

14. The management method according to claim 9, wherein in the implementing the countermeasure, a countermeasure capable of continuing a service relevant to the second constituent element is implemented on the second constituent element.

15. The management method according to claim 9, wherein in the implementing the countermeasure, a countermeasure to be implemented on the second constituent element is determined according to whether an inspection relevant to an anomaly that has occurred in the first constituent element is performed with respect to the second constituent element.

16. A non-transitory computer-readable storage medium storing a program for allowing a computer to execute:

processing of storing configuration information that is related to each constituent element of a system and indicates a configuration of each of the constituent elements;

processing of identifying configuration information of a first constituent element which is a constituent element in which an anomaly has occurred;

processing of identifying a second constituent element which is a constituent element that is related to configuration information including information common to the configuration information of the first constituent element, from the stored configuration information; and processing of implementing, on the second constituent element, a countermeasure related to an anomaly that has occurred in the first constituent element.

17. The non-transitory computer-readable storage medium according to claim 16, wherein in the processing of identifying the second constituent element, a similarity is calculated based on the number of pieces of information common to the configuration information of the first constituent element and the stored configuration information, and a constituent element related to configuration information of which the calculated similarity is equal to or more than a threshold value, among the stored configuration information, is identified as the second constituent element.

18. The non-transitory computer-readable storage medium according to claim 16, wherein in the processing of identifying the second constituent element, a similarity between vulnerability information included in the configuration information of the first constituent element and vulnerability information included in each of the stored configuration information pieces is calculated, and a constituent element related to configuration information of which the calculated similarity is equal to or more than a threshold value, among the stored configuration information, is identified as the second constituent element.

19. The non-transitory computer-readable storage medium according to claim 16, wherein the constituent element of the system includes a plurality of devices and software included in each of the plurality of devices, and in the processing of storing, configuration information pieces relevant to the same device, among the plurality of devices, are stored in association with each other.

20. The non-transitory computer-readable storage medium according to claim 16, storing the program for allowing the computer to further execute processing of detecting an anomaly that has occurred in the constituent element of the system, wherein in the processing of identifying the configuration information of the first constituent element, configuration information of the constituent element in which the detected anomaly has occurred is identified as the configuration information of the first constituent element.

21. The non-transitory computer-readable storage medium according to claim 16, wherein in the processing of implementing, a countermeasure capable of continuing a service relevant to the second constituent element is implemented on the second constituent element.

22. The non-transitory computer-readable storage medium according to claim 16, wherein in the processing of implementing, with reference to operation information related to the second constituent element, a countermeasure to be implemented on the second constituent element is determined according to whether an inspection relevant to an anomaly that has occurred in the first constituent element is performed with respect to the second constituent element.

* * * * *